3,046,103
BONDING COMPOSITIONS CONTAINING MODIFIED TRIMETHYLOLPHENOL COMPOUNDS
Bruce P. Barth, Piscataway Township, Middlesex County, N.J., assignor to Union Carbide Corporation, a corporation of New York
No Drawing. Filed July 2, 1959, Ser. No. 824,458
15 Claims. (Cl. 51—298)

This invention relates to bonding compositions containing modified trimethylolphenol compounds and, more particularly, to modified trimethylolphenol compound bonding compositions exhibiting improved bonding strength.

It has been suggested heretofore to employ trimethylolphenol as a surface coating and as a bonding agent in the fabrication of various abrasive articles, for example, abrasive disks and sandpaper. In such uses, the adhesive strength of the coating and the strength of the bond developed between the abrasive grains and the substrate is of paramount importance. Trimethylolphenol cures to a bond of good strength comparing favorably with known phenolic resin bonds presently used in abrasive applications. An increase in the strength of the bond obtained with trimethylolphenol would further widen its range of uses and give trimethylolphenol a definite competitive edge over many phenolic resins.

It is an object, therefore, of my invention to provide heat curable bonding compositions containing trimethylolphenol compounds which, when cured, exhibit improved strength over bonding compositions containing trimethylolphenol compounds alone.

It is another object to provide fabricated articles made using a heat curable bonding composition containing modified trimethylolphenol compounds.

These and other objects are accomplished in accordance with my invention by forming a heat reactive composition comprising in admixture a major amount by weight of a trimethylolphenol compound, i.e. 2,4,6-trimethylolphenol or an alkali or alkaline earth metal salt of 2,4,6-trimethylolphenol, and a minor amount by weight of animal glue solids. Curing the thus-formed heat reactive mixture results in a hard, infusible, water-resistant bond of great strength. Formation of the heat reactive mixture is suitably carried out by blending the components in a powdered state or with the use of solutions of either the trimethylolphenol compounds or animal glue or both. The powdered blends of the salts particularly can be stored indefinitely, being dissolved in water just prior to use, and are preferred where this is a desirable feature.

The pH of the trimethylolphenol compound-animal glue solution formed from solutions of the components or from a powdered blend of the components has a significant effect on both the processing characteristics of the solution and on the bond finally obtained. The most desirable pH limits are from 1 to about 9 or 10, but higher pH solutions are also operable. Compositions on the basic side, i.e. a pH greater than 7, are characterized by good storage properties or long "shelf life" and compositions on the acidic side, i.e. pH below 7, offer a somewhat more improved cured bond strength. The middle range of pH, about 6 to about 9, gives the optimum combination of adequate storage life and good bond strength properties and is hence preferred. A further advantage of compositions having a pH in the above preferred range is that their substantial neutrality permits contact with paper, cloth or other cellulosic material or web such as used in abrasive element construction, e.g., sandpaper, without deleterious effect thereto.

A shelf life of at least several hours, which is a practical minimum for production and hence a requisite property in commercial bonding compositions, is provided by the trimethylolphenol compound-animal glue composition solutions of my invention. It is known that a rapid increase in viscosity, or gelling, of the bonding composition solution upon standing makes commercial utilization difficult if not wholly impractical and time of use critical. My composition solutions are readily made to have a shelf life comparable and often superior to currently used phenolic resins by simple adjustment of pH and/or use of certain chemical agents which will inhibit gel formation in the compositions immediately after dissolution of the trimethylolphenol compound. These agents are generally termed gel depressing modifiers or gel depressants. Solutions of the compositions of my invention having a pH below about 5 are always stable, while those having a pH above 5 sometimes have a tendency to gel, and use of a gel depressant therewith is highly desirable.

I employ gel depressants only to inhibit immediate gelation. Once this phenomenon is prevented, my dissolved compositions behave similarly to known phenolic resins, as regards increasing slowly in viscosity due to a spontaneous curing process. As a rule, composition solutions having a basic pH age more slowly, i.e., increase in viscosity by self curing more slowly than compositions with an acidic pH irrespective of the presence of a gel depressant. Uniquely, with the use of a dry blend of powdered components of my composition, particularly a calcium trimethylolphenate-animal glue blend, a shelf life of several months and longer is provided with no decrease in bonding effectiveness. It is highly desirable to store the bonding composition in a dry, powdered state until ready for use since this eliminates much of the difficulty ordinarily encountered with viscosity increase through slow curing in standing solutions of the compositions.

Illustrative gel depressants are urea, thiourea, calcium chloride, ammonium nitrate and dicyandiamide. Such compounds, used in amounts of up to about 35 and preferably from 10 to 20 parts by weight per 100 parts by weight of the animal glue, depress the gelling tendencies of the solutions of the compositions of my invention to satisfactorily low levels. Other compounds which inhibit the immediate formation of gels upon blending solutions of animal glue and the trimethylolphenol compound can be used. Conventional fillers and pigments can be used in my composition. It is to be emphasized that the use of a gel depressant is not required with all of the compositions herein disclosed. Some solutions do not gel, others form soft reversible gels. Only those solutions which gel irreversibly need gel depressants. These last-mentioned solutions may form a gel even with the gel depressant present, but it is a reversible gel and reverts to solution after a brief period.

The following table illustrates the shelf life characteristics of typical trimethylolphenol compound-animal glue composition solutions of my invention in comparison with competitive resole resins. Resole A is a very high formaldehyde-to-phenol ratio (approximately 2.7:1) phenolic resin which would at first appear to be similar to trimethylolphenol. Resole B is approximately a 2:1 formaldehyde-to-phenol ratio phenolic resin and typical of presently used bonding compounds.

*Table 1*

AGING RATE

| | Composition | | | | | | |
|---|---|---|---|---|---|---|---|
| | Thio-urea | Trimeth-ylol-phenol | Resole, Resin A | Resole, Resin B | Ani-mal Glue | Glue Gel Strength | pH of Solution |
| A | 5.6 | 100 | 0 | 0 | 28.2 | 200 | 3 |
| B | 5.6 | 100 | 0 | 0 | 28.2 | 200 | 7 |
| C | 5.6 | 100 | 0 | 0 | 28.2 | 200 | 8.5 |
| D[1] | 5.6 | 0 | 100 | 0 | 28.2 | 200 | 7 |
| Control | | 0 | 0 | 100 | | | 9 |

VISCOSITY (CENTISTOKES @ 25° C.)

| I | Days Standing | | |
|---|---|---|---|
| | 0 | 6 | 18 |
| A | 830 | 1,120 | 3,740 |
| B | 510 | 630 | 830 |
| C | 540 | 360 | 530 |
| D[1] | 970 | 960 | 3,450 |
| Control | 200 | 730 | 10,000 |

[1] Animal glue-resole resin blend.

As shown in Table I, the trimethylolphenol-animal glue composition aged at a slower rate than competitive resole resins when compared at equal pH (7.0). The trimethylolphenol-animal glue compositions at pH 7.0 and 8.5 aged at similar rates, both rates being slower than the aging rate at pH 3.0. All the trimethylolphenol-animal glue compositions aged at slower rates than the phenolic resole resin B and therefore are quite well suited to commercial use with regard to shelf life. It will be noted that the viscosities of some of the higher pH compositions actually decreased over the first few days. This is probably due to the fact that the soft gel initially formed had not completely reverted when first tested.

Useful in these compositions to provide the surprising results set forth are trimethylolphenol and alkali and alkaline earth metal salts of trimethylolphenol, such as sodium trimethylolphenate, calcium trimethylolphenate, barium trimethylolphenate and the like. Basically, it is the three reactive methylol groups on the trimethylolphenol compound that provide these desirable results. Other methylolated compounds haivng less than three methylol groups or replaceable aromatic ring hydrogens do not secure these benefits. Thus, when used in this specification, the term "trimethylolphenol" can be considered as synonymous with the alkali and alkaline earth metal salts of trimethylolphenol and the term "trimethylolphenol compound" is meant to include both free 2,4,6-trimethylolphenol and its alkali and alkaline earth metal salts as well as mixtures thereof. The trimethylolphenol compound can be represented by the structural formula

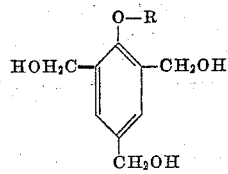

wherein R is hydrogen, an alkali or alkaline earth metal. Trimethylolphenol and its salts are to be sharply distinguished from the unsubstituted phenols and phenolic resins generally since they alone, among them, have no reactive ring hydrogens and in combination with animal glue, are solely able to confer the advantages set forth herein. In practice, an aqueous solution of trimethylolphenol or metal salt thereof is suitably used as a starting material, although a powdered solid of either is also suitable.

Animal glue as used herein refers to complex organic materials of natural origin. Generally, these are impure gelatins obtained from animal organs by boiling with water, straining and drying. I particularly prefer proteinaceous substances which are insoluble in all neutral solvents, such as are generally termed "albuminoids" or "scleroproteins." Included in these latter terms are: elastins which are derived from ligaments; keratins obtained from horns, hooves, feathers, quills and the like; and collagens produced from hides, tendons and bones. The animal glue component of the compositions of this invention is readily added as a finely crushed powder or as an aqueous solution to the solution or powder of trimethylolphenol, or the crystalline trimethylolphenol or salt can be added to solution of the animal glue.

A preferred manner of preparing the animal glue-trimethylolphenol compound mixture, useful where a gel depressing modifier is to be incorporated in the composition, comprises blending the amount of animal glue desired to be in the final composition in a solution of the desired amount of gel depressant and homogenizing the mixture by agitating for approximately 1 hour and thereafter adding the desired amount of trimethylolphenol compound as a solid, or more conveniently as an aqueous solution. Alternatively, a dry blend or trimethylolphenol or a salt thereof, a gel depressant and animal glue can be used. Suitably, pH adjustments can be made after the dissolution of the trimethylolphenol compound. To adjust the pH, I prefer to use a 75% solution of $H_3PO_4$ or a 25% solution of NaOH. Certain acids, notably acetic acid and hydrochloric acid, lower water resistance and bond strength and hence are not desirable.

Although trimethylolphenol compounds modified with from 2 and up to but not including 100 parts by weight of animal glue solids per 100 parts by weight of the trimethylolphenol compound, i.e. less than a 1:1 weight ratio of animal glue to trimethylolphenol compound, are improved in bond strength, the amount of improvement achieved by incorporation of above about 60 parts by weight of animal glue solids per 100 parts by weight of trimethylolphenol compound, i.e. a 0.6:1.0 weight ratio, is small and becomes progressively less significant as a 1:1 weight ratio is approached. Simultaneously with the improvement in bond strength, the degree of water resistance of the bonds becomes substantially lessened. So, while wet bond strength is not critical in all applications and, hence, compositions containing just under equal parts by weight of animal glue solids and trimethylolphenol are useful, I prefer compositions containing substantially less than nearly equal parts by weight, of animal glue solids compared to the trimethylolphenol compound content. I have found compositions containing up to about 40 parts by weight of animal glue solids per 100 parts by weight of trimethylolphenol compound provide highly desirable improvements in bond strength and suffer only inconsequential decreases in wet bond strength. I particularly prefer compositions containing from about 20 to about 30 parts by weight of animal glue solids per 100 parts by weight of trimethylolphenol compound. These last-mentioned compositions provide the greatest increase in bond strength and undergo little or no decrease, and in some cases improvement even, in wet bond strength. In the compositions of my invention, a trimethylolphenol compound modified with up to but not including equal parts by weight of animal glue solids is superior to trimethylolphenol compounds alone in dry bond strength. Preferred compositions are generally nearly equivalent or slightly superior in wet bond strength as well.

Another variable in formulating my compositions is the gel strength of the animal glue employed. There are approximately 18 commercial grades of animal glue which are classified according to gel strength, determined as follows: A 0.5 inch diameter plunger is driven a distance of 4 mm. into a gelled solution containing 12.5% glue solids which has been conditioned 16 to 18 hours at 10° C. The force in grams required to push the plunger is the gel strength of the glue and ranges from 0 to about 411. The medium to higher gel strength glues, i.e., 100 to about 300, are preferred in the compositions of my invention. They provide greater increases in bond strength part for part than lower gel strength glues and have a less significant effect on wet bond strength. The higher gel strength glues are more costly, however. Hence, a compromise of bond strength, water resistance and cost will determine which gel strength glue to employ.

To illustrate the practice of my invention, the following examples are provided. All parts and percentages are by weight unless otherwise noted. In order to test the strength of the bonds obtained by the use of the compositions of the invention with abrasive grains, test specimens were molded and their tensile strength determined. Similar molded test specimens were prepared with materials known and widely used by the art. In all of these test specimens a portion of the bonding composition was found to volatilize during cure. To compensate for this and to ensure that each test specimen contained the same weight of bonding material, all compositions were diluted with water to give a content of non-volatile matter of 50%. Thus, after curing and consequent volatilization of water and other materials, all specimens had approximately the same weight of cured binder. Actual determination of the non-volatile matter content (N.V.M.) of the compositions was made by placing a 1.5 gram aliquot thereof in a 2-inch diameter ointment tin and heating at 275° F. for 3 hours in a circulating air oven.

The following examples are illustrative of this invention. Unless otherwise indicated, all parts are by weight.

*Example I.*—Bonding compositions containing two different weights of either 200 or 130 gel strength glue were prepared in the following manner:

Finely crushed glue was added to a solution of 5.6 parts thiourea in water. The glue was agitated in the gel depressant for a period of 30–60 minutes until a homogeneous blend was achieved. To portions of this homogeneous blend were added the 100 parts of trimethylolphenol. For convenience, the trimethylolphenol was added in the form of a water solution containing 70% by weight trimethylolphenol made by the method disclosed in U.S. Patent No. 2,889,374 to C. Y. Meyers; hence, 142.9 parts of the 70% solution were added. A number of mixtures whose compositions are given in Table II below were made up in this manner. In each instance, the pH was adjusted to 7.0 with 75% phosphoric acid and with water the N.V.M. was adjusted to 50% by weight.

In order to determine the tensile strength of the compositions, test specimens of abrasive sand grains bonded with the compositions were prepared.

Four hundred grams of Wedron 60 sand were placed in a Model No. K4–B Kitchen Aid Mixer and were blended therein with forty grams of one of the trimethylolphenol/glue compositions prepared above, for about five minutes. Five 27.5 gram portions of the blended sand and bonding composition were weighed out and molded into 3″ by ¼″ dog bone-shaped tensile test specimens. These were cured by heating two hours at 275° F. The samples were tested for tensile strength in a Tinius-Olsen testing machine with the jaw separation speed set at 0.25 in./min. The results are presented in Table II below. Results of the test on unmodified trimethylolphenol bonding material are presented for comparison.

Table II

COMPOSITION

| II | Parts by Weight | | | Glue Gel Strength |
|---|---|---|---|---|
| | Thiourea | Trimethylolphenol | Glue | |
| Control | 0 | 100 | 0 | |
| A | 5.6 | 100 | 28.2 | 200 |
| B | 5.6 | 100 | 28.2 | 130 |
| C | 5.6 | 100 | 28.2 | 0 |
| D | 2.5 | 100 | 12.4 | 200 |
| E | 2.5 | 100 | 12.4 | 130 |
| F | 2.5 | 100 | 12.4 | 0 |

TENSILE STRENGTH TEST RESULTS

| II | After Cure | Percent Change | After Cure + 24 Hrs. in H₂O @ 25° C. | Percent Change |
|---|---|---|---|---|
| Control | 675 | | 236 | |
| A | 1,109 | +64 | 230 | −2.5 |
| B | 811 | +20 | 163 | −31 |
| C | 759 | +15 | 13 | −95 |
| D | 930 | +38 | 178 | −25 |
| E | 846 | +25 | 184 | −22 |
| F | 714 | +5.8 | 14 | −94 |

*Example II.*—Five compositions were prepared in accordance with the method of Example I to illustrate the effect of changes in glue gel strength and amount of glue employed, except that 75% phosphoric acid was added prior to mixing in the glue. After agitation of the indicated amounts of components, the compositions passed through a soft gel stage, then reverted to freely mobile liquids. These solutions were adjusted to pH 8 with 25% aqueous NaOH. The bonding compositions were tested as in Example I. The content of the compositions and results obtained are summarized in Table III.

Table III

COMPOSITION

| III | Parts by Weight | | | H₃PO₄ | Glue Gel Strength |
|---|---|---|---|---|---|
| | Thiourea | Trimethylolphenol | Glue | | |
| Control | | 100 | 0 | | |
| A | 3.4 | 100 | 24.2 | 1.9 | 315 |
| B | 3.4 | 100 | 24.2 | 1.9 | 251 |
| C | 3.4 | 100 | 24.2 | 1.9 | 200 |
| D | 4.2 | 100 | 29.6 | 2.3 | 200 |
| E | 8.3 | 100 | 61.4 | 4.8 | 200 |

TENSILE STRENGTH TEST RESULTS

| III | After Cure | Percent Change | After Cure + 24 Hrs. in H₂O @ 25° C. | Percent Change |
|---|---|---|---|---|
| Control | 675 | | 236 | |
| A | 1,030 | +52 | 276 | +12 |
| B | 1,078 | +59 | 209 | −12 |
| C | 1,228 | +96 | 162 | −32 |
| D | 1,034 | +53 | 139 | −41 |
| E | 1,186 | +76 | 51 | −78 |

The superiority of higher gel strength glues in both dry and wet strength is manifest from a consideration of III A, B and C. It can also be easily seen that above about 60 parts animal glue water resistance falls off rapidly but dry bond strength is greatly improved.

*Example III.*—The effect of pH levels on compositions of my invention was determined by preparing a mixture containing 100 parts trimethylolphenol, 5.6 parts gel depressant and 28.2 parts animal glue solids in the manner of Example I. This mixture was divided into 3 portions which were each adjusted to a different pH with either 25% aqueous NaOH or 75% H₃PO₄. Test specimens were again prepared and tested as in Example I.

Table IV

COMPOSITIONS

| IV | Parts by Weight | | | Glue Gel Strength | pH Solution |
|---|---|---|---|---|---|
| | Thiourea | Trimethylolphenol | Glue | | |
| Control | | 100 | 28.2 | 200 | 7.0 |
| A | 5.6 | 100 | 28.2 | 200 | 3.0 |
| B | 5.6 | 100 | 28.2 | 200 | 7.0 |
| C | 5.6 | 100 | 28.2 | 200 | 8.5 |

TENSILE STRENGTH TEST RESULTS

| IV | After Cure | Percent Change | After Cure + 24 Hrs. in $H_2O$ @ 25° C. | Percent Change |
|---|---|---|---|---|
| Control | 675 | | 236 | |
| A | 1,191 | +77 | 90 | −62 |
| B | 1,109 | +64 | 230 | −2.5 |
| C | 952 | +41 | 117 | −50 |

The data clearly indicate that at increased pH, dry bond strength improvement is outstanding, and above pH 7, slightly less so. Wet strength of the bond is, however, affected by changes from about pH 7 in either direction.

*Example IV.*—Using the procedure of Example I, several compositions were prepared containing 200 gel strength glue and thiourea. The pH was adjusted to 7.0 with 75% $H_3PO_4$. Similar compositions were prepared using a commercial, water-soluble, liquid resole made with a very high formaldehyde-to-phenol ratio in place of the trimethylolphenol. Test specimens were prepared and tested as in Example I.

Table V

COMPOSITIONS

| V | Thiourea | Resole | Trimethylolphenol | Glue | Glue Gel Strength |
|---|---|---|---|---|---|
| Control | 0 | 0 | 100 | | |
| A | 5.6 | 0 | 100 | 28.2 | 200 |
| B [1] | 5.6 | 100 | 0 | 28.2 | 200 |
| C | 2.5 | 0 | 100 | 12.4 | 200 |
| D [1] | 2.5 | 100 | 0 | 12.4 | 200 |
| Control | 0 | 100 | 0 | | |

TENSILE STRENGTH TEST RESULTS

| V | After Cure | Percent Change | After Cure + 24 Hrs. in Rm. Temp. $H_2O$ | Percent Change |
|---|---|---|---|---|
| Control | 675 | | 236 | |
| A | 1,109 | +64 | 230 | −2.5 |
| B [1] | 973 | +50 | 51 | −87 |
| C | 811 | +20 | 163 | −31 |
| D [1] | 702 | +9 | 34 | −91 |
| Control | 647 | | 397 | |

[1] Animal glue/resole resin blend.

It is apparent from the table above that the animal glue modified trimethylolphenol compositions are superior at both concentrations of animal glue to the highly methylolated resole phenolic resin. It is noteworthy, too, that water resistance was much better in the trimethylolphenol compositions than in the resole compositions containing equal portions of animal glue.

The explanation of the uniqueness of the trimethylolphenol compound reaction with animal glue which distinguishes trimethylolphenol compound-animal glue compositions from phenolic resin-animal glue compositions and phenolic resins alone is thought to be in the absence of reactive ring hydrogens on trimethylolphenol compounds. Reactive ring hydrogens are normally present in the positions ortho and para to the phenolic hydroxyl group in phenolic resins. In trimethylolphenol, however, these positions are occupied by methylol groups. Methylol groups present in a reaction system, whether on the trimethylolphenol or on the resole, will react with either (A) a reactive ring hydrogen, if any are available, or (B) another methylol group, or (C) some other reactive group, e.g., a primary or secondary amino group. Reaction A proceeds much more rapidly than B or C, and while there are reactive ring hydrogens available, the methylol reacts almost exclusively therewith. The molecules in the system are immobilized because of the development of cross-linkages. The retarded movement of both the methylol groups and the other reactive groups greatly inhibits reaction. In an animal glue/conventional phenolic resin system, the amino and hydroxyl groups do not react to any appreciable extent with the methylol groups until the reactive ring hydrogens on the phenol are substantially exhausted; and cross-linking causes a retardation of molecule mobility. Consequently, the animal glue molecules are, in all probability, merely mechanically mixed in an unreacted state within the resin system.

In a trimethylolphenol-animal glue system, however, there are no reactive ring hydrogens present and the primary and second amino and hydroxyl groups are able to compete successfully for methylol groups against the methylol auto-condensation reaction, and the trimethylolphenol and animal glue are chemically interreacted with one another. It is possible that this extensive chemical interreaction is responsible for the many outstanding properties, hereinbefore more fully set forth, of the compositions of my invention.

The compositions of my invention are usable in aqueous solution for bonding abrasive grit to itself or to a variety of substrates. The composition is particularly useful in fabrication of sandpaper and set up wheels.

What is claimed is:

1. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 up to but not including 100 parts by weight of animal glue solids per 100 parts by weight of said trimethylolphenol compound.

2. A heat reactive bonding composition comprising in aqueous solution a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 up to but not including 100 parts by weight of animal glue solids per 100 parts by weight of said trimethylolphenol compound.

3. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 to 60 parts by weight of animal glue solids per 100 parts by weight of said trimethylolphenol compound.

4. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 to about 40 parts by weight of animal glue solids per 100 parts by weight of said trimethylolphenol compound, said composition being resistant to premature gelation.

5. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from about 20 to about 30 parts by weight of animal glue solids per 100 parts by weight of said trimethylolphenol compound, said composition being resistant to premature gelation.

6. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 up to but not including 100 parts by weight of animal glue solids per 100 parts by weight of said trimethylolphenol compound, and a sufficient amount of a gel depressing modifier to inhibit premature gelation of the composition, said animal glue in the composition having a gel strength above about 200.

7. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from about 20 to about 30 parts by weight of animal glue solids per 100 parts by weight of a trimethylolphenol compound and a sufficient amount of a gel depressing modifier to inhibit premature gelation of the composition, said animal glue in the composition having gel strength above about 200.

8. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 to about 40 parts by weight of animal glue solids per 100 parts by weight of said trimethylolphenol compound, and a sufficient amount of a gel depressing modifier to inhibit premature gelation of the composition, said animal glue in the composition having a gel strength above about 200, said composition having a pH between about 1 and 10.

9. A heat reactive bonding composition comprising a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 to about 40 parts by weight of animal glue solids per 100 parts by weight of said trimethylolphenol compound, and a sufficient amount of a gel depressing modifier to inhibit premature gelation of the composition, said animal glue in the composition having a gel strength above about 200, said composition having a pH between 6 and 9.

10. The composition claimed in claim 1 wherein the trimethylolphenol compound is 2,4,6-trimethylolphenol.

11. The composition claimed in claim 1 wherein the trimethylolphenol compound is an alkali metal salt of 2,4,6-trimethylolphenol.

12. The composition claimed in claim 1 wherein said trimethylolphenol compound is an alkaline earth metal salt of 2,4,6-trimethylolphenol.

13. The composition claimed in claim 1 wherein said trimethylolphenol compound is calcium 2,4,6-trimethylolphenate.

14. In an abrasive article comprising abrasive grains bonded together, the improvement which comprises having the abrasive grains bonded together with the cured reaction product of a trimethylolphenol compound selected from the group consisting of 2,4,6-trimethylolphenol, alkali metal salts of 2,4,6-trimethylolphenol and alkaline earth metal salts of 2,4,6-trimethylolphenol, and from 2 up to but not including 100 parts by weight of animal glue solids per 100 parts by weight of said trimethylolphenol compound.

15. Abrasive grains coated with the cured reaction product of a trimethylolphenol selected from the group consisting of 2,4,6-trimethylolphenol, alkali metal salts of 2,4,6-trimethylolphenol and from 2 alkaline earth metal salts of 2,4,6-trimethylolphenol, and up to but not including 100 parts by weight of animal glue solids per 100 parts by weight of said trimethylolphenol compound.

References Cited in the file of this patent

UNITED STATES PATENTS 2,468,531    Weeldenburg  ---------- Apr. 26, 1949

UNITED STATES PATENT OFFICE
CERTIFICATE OF CORRECTION

Patent No. 3,046,103            July 24, 1962

Bruce P. Barth

It is hereby certified that error appears in the above numbered patent requiring correction and that the said Letters Patent should read as corrected below.

Column 3, line 56, for "haivng" read -- having --; column 4, line 32, for "or" read -- of --; column 10, line 29, strike out "from 2" and insert the same after "and" in line 30, same column 10.

Signed and sealed this 13th day of November 1962.

(SEAL)
Attest:

ERNEST W. SWIDER
Attesting Officer

DAVID L. LADD
Commissioner of Patents